United States Patent [19]
Marsh et al.

[11] Patent Number: 5,964,491
[45] Date of Patent: Oct. 12, 1999

[54] INTEGRATED MODULAR PACKAGE TRAY ASSEMBLY

[75] Inventors: Robert Henry Marsh, Ann Arbor; Joseph Valentine Bejster; Ronald Kemble Roberts, both of Dearborn; Stephen Michael Lavender, Ann Arbor, all of Mich.

[73] Assignee: Ford Motor Company, Dearborn, Mich.

[21] Appl. No.: 09/274,555

[22] Filed: Mar. 23, 1999

Related U.S. Application Data

[60] Provisional application No. 60/082,641, Apr. 22, 1998.

[51] Int. Cl.$^6$ ....................................................... B60R 7/04
[52] U.S. Cl. ........................................ 296/37.16; 224/275
[58] Field of Search ................................ 296/37.16, 37.8; 224/275, 542, 539, 540, 543

[56] References Cited

U.S. PATENT DOCUMENTS

| | | |
|---|---|---|
| 5,076,631 | 12/1991 | Lord, Jr. . |
| 5,171,054 | 12/1992 | Wilson . |
| 5,174,628 | 12/1992 | Hayatsugu et al. . |
| 5,498,050 | 3/1996 | Maruyama et al. . |
| 5,580,153 | 12/1996 | Motz . |
| 5,663,534 | 9/1997 | von Hagen et al. . |
| 5,685,591 | 11/1997 | Simplicean et al. . |

*Primary Examiner*—Gary C. Hoge
*Attorney, Agent, or Firm*—Leslie C. Hodges

[57] ABSTRACT

A modular package tray for an automotive vehicle, comprising: a generally hollow, generally rectangular plastic housing 10 having an interior cavity 12, opposed upper and lower wall sections 14/15, opposed forward and rearward longitudinal edges 16/17, and opposed left and right lateral edges 18; and left and right wing sections 20 each attached to a respective one of the left and right lateral edges 18 by a living hinge 30 integrally molded with the plastic housing. Each of the wings 20 may be folded about its respective living hinge 30 in order to temporarily reduce the overall length of the package tray, thus permitting the package tray to be easily installed or removed through the rear window of the vehicle. The package tray may further include a center high mount stop light 60, in-molded carpet 40 generally covering the upper wall section 14, and one or more audio speaker assemblies 52.

20 Claims, 2 Drawing Sheets

INTEGRATED MODULAR PACKAGE TRAY ASSEMBLY

This application claims the benefit of U.S. Provisional Application No. 60/082,641, filed Apr. 22, 1998.

BACKGROUND OF THE INVENTION

1. Field of the Invention

The present invention relates generally to vehicle package trays, and more particularly to integrated modular package trays for motor vehicles.

2. Disclosure Information

U.S. Pat. No. 5,685,591 to Simplicean et al. (hereinafter "Simplicean"), which is incorporated herein by reference, discloses a modular package tray for a motor vehicle. This package tray has the advantage of integrating together a package tray surface, a sealed resonance chamber for speakers, and reliefs in the outer surfaces thereof for attachment of electronic modules and for holding umbrellas and other passenger items, all on a single blowmolded housing.

The vehicle package tray disclosed in Simplicean provides the convenience and efficiency of having all of the aforementioned features and elements combined in a single unit. This makes assembly of the unit into a vehicle much simpler and easier than the conventional approach of installing and attaching several smaller individual pieces. However, because of the large size of the unit, it usually must be passed through one of the vehicle doors into the vehicle interior and installed in place from inside the vehicle. This is often cumbersome to do and does not lend itself well to automation. It would be desirable, therefore, to provide an integrated vehicle package tray which provides generally the same advantages as the unit disclosed by Simplicean, but with the added advantage of being installable through less cumbersome means.

SUMMARY OF THE INVENTION

The present invention overcomes the disadvantages of the prior art approaches by providing an integrated modular package tray which is easily installable through a vehicle rear window. The package tray comprises: a generally hollow, generally rectangular plastic housing having an interior cavity, opposed upper and lower wall sections, opposed forward and rearward longitudinal edges, and opposed left and right lateral edges; and left and right wing sections each attached to a respective one of the left and right lateral edges by a living hinge integrally molded with the plastic housing. The package tray may further include a center high mount stop light, in-molded carpet generally covering the upper wall section, and one or more audio speaker assemblies.

It is an object and advantage of the present invention that each of the wing sections may be folded about its respective living hinge in order to temporarily reduce the overall length of the package tray, thus permitting the package tray to be easily installed or removed through the rear window of the vehicle.

Another advantage of the present invention is that the wing sections may be sized and shaped to serve as trim pieces covering the C-pillar area of an automotive vehicle interior passenger compartment.

These and other advantages, features and objects of the invention will become apparent from the drawings, detailed description and claims which follow.

DETAILED DESCRIPTION OF THE PREFERRED EMBODIMENTS

Figure 1:
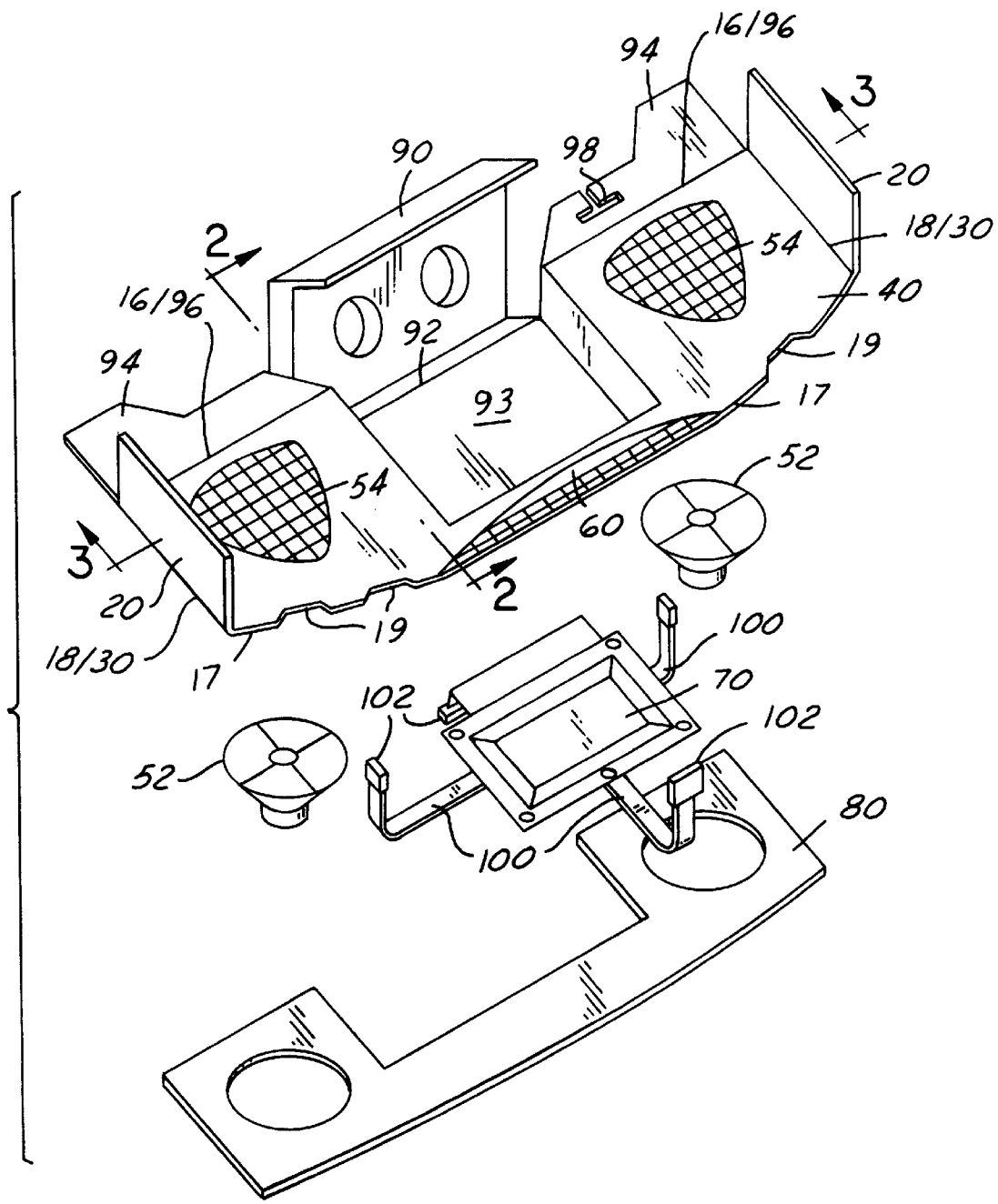
FIG. 1 is an exploded perspective view of a modular package tray according to the present invention.
Figure 2:
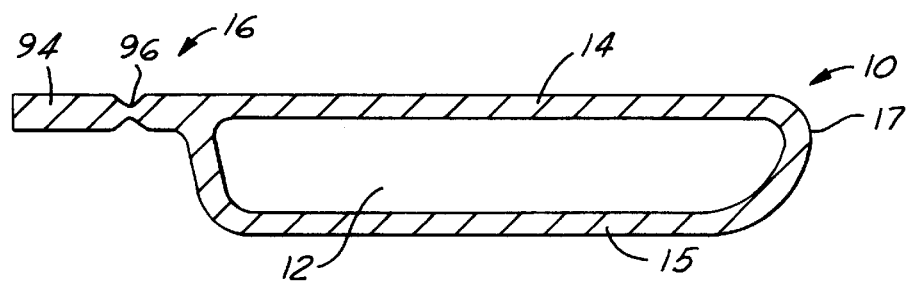
FIG. 2 is a cross-sectional side view of the modular package tray of FIG. 1 as taken along line 2—2.
Figure 3:
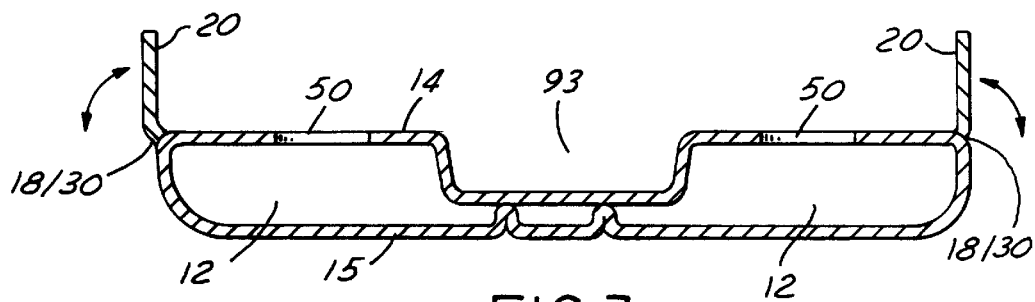
FIG. 3 is a cross-sectional front view of the modular package tray of FIG. 1 as taken along line 3—3.

Referring now to the drawings, FIGS. 1–3 show a modular package tray (MPT) for an automotive vehicle according to the present invention. The MPT comprises: a generally hollow, generally rectangular plastic housing 10 having an interior cavity 12, opposed upper and lower wall sections 14/15, opposed forward and rearward longitudinal edges 16/17, and opposed left and right lateral edges 18; and left and right wing sections 20 each attached to a respective one of the left and right lateral edges 18 by a living hinge 30 that is integrally molded with the plastic housing 10.

To assist the reader in understanding the present invention, all reference numbers used herein are summarized in the table below, along with the elements they represent:

10=Plastic housing
12=Interior cavity of housing
14=Upper wall section of housing
15=Lower wall section of housing
16=Forward longitudinal edge of housing
17=Rearward longitudinal edge of housing
18=Left/right lateral edges of housing
19=Cutout(s) in perimeter of housing
20=Left and right wing sections
30=Living hinges at lateral edges of housing
40=In-molded carpet
42=Carpet draping tabs
50=Hole(s) formed in upper wall section/carpet
52=Audio speaker assembly
54=Speaker grill assembly
60=Center high mount stop light (CHMSL)
70=Electronic module
80=NVH barrier/seal
90=Storage compartment door
92=Living hinge at forward edge/storage door
93=Storage compartment/cavity
94=Forward flap
96=Living hinge at forward edge/forward flap
98=Cut-out in forward flap for seat belt
100=Electrical wiring
102=Electrical connectors
202=Mold cavity
204=Mold core The housing 10 is preferably blowmolded, but may be formed by other known processes which are capable of producing a hollow plastic part of the size required. For example, the housing may instead be formed of two thermoformed, vacuum formed, or injection molded plastic upper and lower shells (analogous to the upper and lower wall sections 14/15) which may then be joined by ultrasonic welding, heat staking, or the like. Blowmolding is the preferred method because it provides a single, hollow piece in one operation, thus avoiding the need for post-mold joining of two separate shells.

The left and right wing sections 20 and their respective integral living hinges 30 should be made of plastic and integrally molded with the housing 10; that is, the housing 10, living hinges 30, and wings 20 should all be formed simultaneously as a single plastic piece. The wings 20 and living hinges 30 should preferably be designed such that each wing may be folded inward about its respective living hinge by at least 90 degrees, as illustrated in FIG. 3. This temporarily reduces the overall length of the MPT, thus permitting it to be easily installed (or removed for servicing, etc.) through the rear window of the vehicle.

Figure 4:
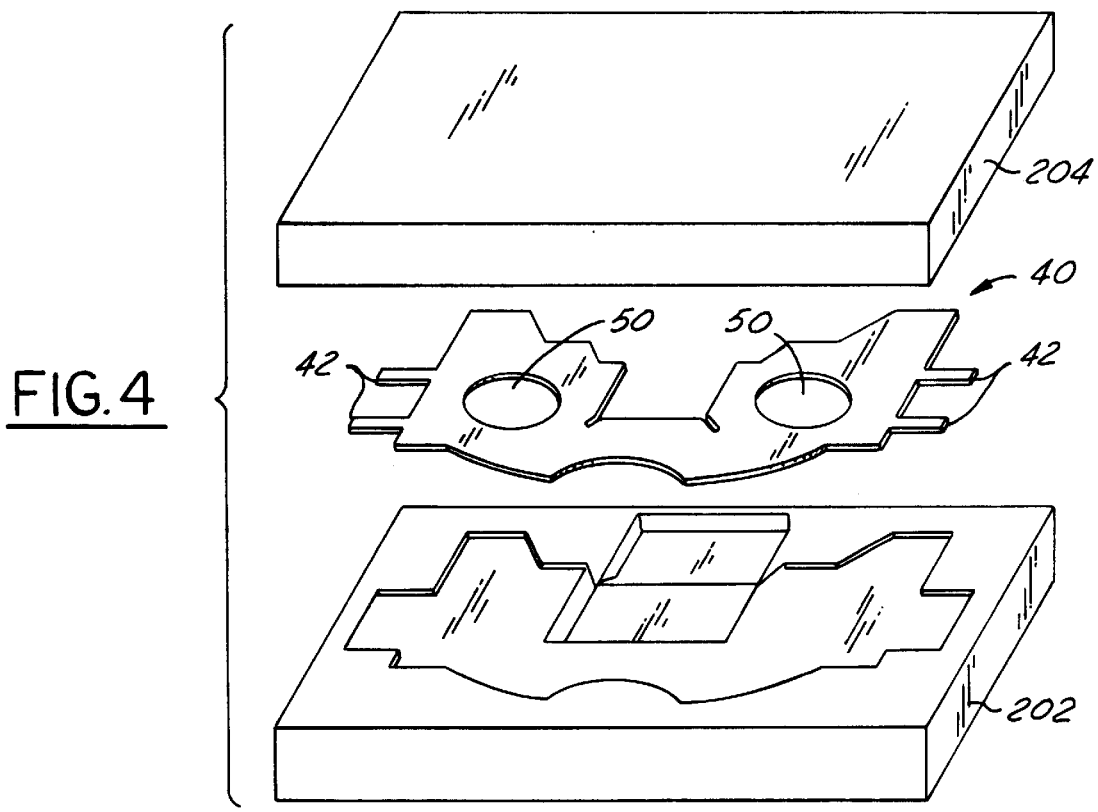
FIG. 4 is an exploded perspective view of a mold for blowmolding the modular package tray according to the present invention, illustrating how a carpet may be draped in the mold and in-molded onto the modular package tray.

The MPT may further comprise in-molded carpet 40 generally covering the upper wall section 14. As used herein, in-molded "carpet" 40 preferably refers to conventional carpet or carpet-like material commonly used in automotive vehicle interiors as an aesthetic (and/or functional) covering, on such surfaces as doors, headliners, seats/seatbacks, and conventional package trays. However, the term "carpet" as used herein is intended to broadly include any aesthetic and/or functional cloth, fabric, textile, foam, hide, or other product which may be in-molded with the plastic housing so as to provide a finished surface to the upper wall portion 14. FIG. 4 shows how one or more pieces of carpet 40 (preferably one) may be draped into a mold prior to closing of the mold core 204 and cavity 202. The carpet 40 may include cut-outs 50 therein for the speaker assemblies, and/or other cut-outs and reliefs to accommodate other features (such as a relief in the forward longitudinal edge of the carpet for a storage compartment door). The carpet 40 may also include draping tabs 42 extending outward from the general perimeter of the carpet, to assist in handling and placement of the carpet. These tabs 42 may also be pinched by the core and cavity upon closing of the mold in order to hold the carpet in place during molding. Each piece of carpet 40 may be placed on the cavity surface or the core surface, depending upon which respective surface of the MPT is to be carpeted.

In addition to the in-molded carpet 40, the MPT may further include an in-molded "NVH" (i.e., noise, vibration, and handling) barrier or seal 80. The NVH barrier/seal 80 may generally cover the lower wall section 15, and/or it may be disposed generally about the perimeter of the housing 10 (i.e., generally along the longitudinal and lateral edges 16/17/18). The NVH barrier/seal 80 may provide a means of gasketing or sealing the MPT against the vehicle body structure, so as to prevent or mitigate the seepage of air, water, and/or noise into the car interior. The NVH barrier/seal 80 may be an elastomeric gasket, a foam sheet with a waterproof liner, or the like. As an alternative to in-molding the NVH barrier/seal 80, it may instead be applied in a post-mold step using adhesives, fasteners, and the like.

The wing sections 20 may optionally be designed so as to extend up and cover the adjacent C-pillar trim panel of the vehicle when installed therein. Each wing 20 may extend up a fraction of the trim panel height, or it may extend to the panel's full height such that the distal edge of the wing lies adjacent the vehicle headliner. As with the upper wall section, each wing section 20 may also be provided with in-molded carpet generally covering the upper surface of each wing. The wing sections 20 may cover an existing C-pillar trim panel, or the separate C-pillar trim panels may be eliminated and the wing sections 20 themselves may serve as C-pillar trim panels. In either case, the wing sections 20 extend up at least a portion of the C-pillar trim area (defined as that area over the C-pillar which is conventionally covered with a C-pillar trim panel of some sort).

Because the MPT of the present invention is generally hollow, the interior housing cavity 12 may serve as a resonance chamber for audio speakers. The MPT may thus include at least one hole 50 defined in the upper wall section 14, and an audio speaker assembly 52 sealably disposed within each hole. The speaker assembly 52 may include a speaker cone, magnet assembly, and the like, mated with a speaker grill or cover assembly 54 removably attached to the top surface of the upper wall 14. The speaker assembly 52 preferably comprises a sub-woofer, but may alternatively (or additionally) include one or more tweeters, mid-range speakers, and/or woofers. In order to maximize the effectiveness of the cavity 12 as a sub-woofer resonance chamber, the volume of the cavity should be generally about 20 liters; also, with the speaker assembly(s) 52 mounted in place, the cavity/chamber 12 should be generally sealed against air leakage.

The MPT may further comprise a center high-mount stop lamp (CHMSL) assembly 60 attached to the upper wall section 14. The CHMSL should be mounted so that it projects/signals rearwardly with respect to the vehicle. The MPT may also include one or more electronic modules 70, preferably removably attached to the lower wall section 15. Examples of such modules 70 include the electronic components and hardware for a speaker/sub-woofer amplifier, voice module, navigation system, global positioning satellite (GPS) system, cellular phone system, anti-theft system, emergency transponder, Rear Electronics Module (REM), and the like. To connect the modules 70, CHMSL 60, and speakers 52 to each other and to the rest of the vehicle, one or more runs of electrical wiring 100 may be provided as illustrated in FIG. 1. The electrical wiring 100 may comprise flex circuits, ribbon cable, conventional wire harnesses, or the like, with suitable electrical connectors 102 at each end to effect electrical connection among the various electrical components.

About the periphery/perimeter of the housing 10, one or more inwardly extending cut-outs or reliefs 19 may be defined. These features 19 provide for relief of door slam pressure whenever a vehicle door or trunk lid is slammed shut. As shown in FIG. 1, these cut-outs 19 are preferably defined in the rearward longitudinal edge 17, but may optionally be defined in other perimeter edges as well.

As illustrated in FIG. 1, the MPT may further include a storage compartment 93 (preferably in the center of the upper wall 14) with a door 90 connected to the housing 10 by a living hinge 92 at the forward longitudinal edge 16 of the housing. The compartment 93, door 90, and living hinge 92 are designed such that the door 90 may be folded upward about the hinge 92 so as to close upon the compartment 93. Optional fasteners (not shown) may be provided on the door 90 and/or within/about the compartment 93 so that the door may be releasably fastened shut upon the storage compartment. The MPT may also include one or more (preferably two) forward flaps 94 contiguously connected to the housing at the forward longitudinal edge 16 by living hinges 96. These forward flaps 94 may serve as trim panels for aesthetically mating the MPT with the rear passenger seats, and/or may serve to further structurally support the MPT within the vehicle frame. The flaps 94 may optionally include one or more cut-outs 98 therein through which seat belts may pass.

Various other modifications to the present invention may occur to those skilled in the art to which the present invention pertains. Other modifications not explicitly mentioned herein are also possible and within the scope of the present invention. It is the following claims, including all equivalents, which define the scope of the present invention.

What is claimed is:

1. A modular package tray for an automotive vehicle, comprising:
 a generally hollow, generally rectangular plastic housing having an interior cavity, opposed upper and lower wall sections, opposed forward and rearward longitudinal edges, and opposed left and right lateral edges; and
 left and right wing sections each attached to a respective one of said left and right lateral edges by a living hinge integrally molded with said plastic housing.

2. A modular package tray according to claim 1, wherein the volume of said interior cavity is generally about 20 liters.

3. A modular package tray according to claim 1, wherein each wing section may be folded inward about its respective living hinge by at least 90 degrees.

4. A modular package tray according to claim 1, further comprising in-molded carpet generally covering said upper wall section.

5. A modular package tray according to claim 1, wherein each of said wing sections extends up an adjacent C-pillar trim area of the automotive vehicle when installed therein.

6. A modular package tray according to claim 5, further comprising in-molded carpet generally covering an upper surface of each of said wall sections.

7. A modular package tray according to claim 1, further comprising at least one hole defined in said upper wall section and an audio speaker assembly sealably disposed within each hole.

8. A modular package tray according to claim 1, further comprising a center high-mount stop lamp assembly attached to said upper wall section.

9. A modular package tray according to claim 1, further comprising at least one electronic module attached to said lower wall section.

10. A modular package tray according to claim 1, further comprising an in-molded gasketing means for mitigating the passage of air, noise and water past said modular package tray into the passenger compartment of said automotive vehicle, wherein said gasketing means generally covers said lower wall section.

11. A modular package tray according to claim 1, further comprising an in-molded gasketing means for mitigating the passage of air, noise and water past said modular package tray into the passenger compartment of said automotive vehicle, wherein said gasketing means is disposed generally about the perimeter of said housing.

12. A modular package tray according to claim 1, further comprising at least one inwardly extending cut-out in the perimeter of said housing for relief of door slam pressure.

13. A modular package tray according to claim 1, further comprising:
 a storage compartment recessed into a top surface of said upper wall section; and
 a storage compartment door connected to said forward longitudinal edge by a living hinge integrally molded with said housing, wherein said door is operative to fold upward about said living hinge so as to close upon said storage compartment.

14. A modular package tray according to claim 1, further comprising at least one forward flap connected to said forward longitudinal edge by a living hinge integrally molded with said housing.

15. A modular package tray for an automotive vehicle, comprising:
 a generally hollow, generally rectangular plastic housing having an interior cavity, opposed upper and lower wall sections, opposed forward and rearward longitudinal edges, and opposed left and right lateral edges;
 left and right wing sections each attached to a respective one of said left and right lateral edges by a living hinge integrally molded with said plastic housing; and
 in-molded carpet generally covering said upper wall section.

16. A modular package tray according to claim 15, further comprising at least one hole defined in said upper wall section and said in-molded carpet, and an audio speaker assembly sealably disposed within each hole.

17. A modular package tray according to claim 15, further comprising a center high-mount stop lamp attached to said upper wall section.

18. A modular package tray according to claim 15, further comprising at least one electronic module attached to said lower wall section.

19. A modular package tray according to claim 15, wherein each wing section may be folded inward about its respective living hinge by at least 90 degrees.

20. A modular package tray for an automotive vehicle, comprising:
 a generally hollow, generally rectangular plastic housing having an interior cavity, opposed upper and lower wall sections, opposed forward and rearward longitudinal edges, and opposed left and right lateral edges;
 left and right wing sections each attached to a respective one of said left and right lateral edges by a living hinge integrally molded with said plastic housing, wherein each wing section may be folded inward about its respective living hinge by at least 90 degrees;
 in-molded carpet generally covering said upper wall section;
 at least one hole defined in said upper wall section and said in-molded carpet;
 an audio speaker assembly sealably disposed within each hole;
 a center high-mount stop lamp attached to said upper wall section; and
 at least one electronic module attached to said lower wall section.

* * * * *